United States Patent
Omura

[19]

[11] Patent Number: 5,956,072
[45] Date of Patent: Sep. 21, 1999

[54] OPTICAL SCANNER, IMAGE FORMING APPARATUS AND IMAGE FORMING APPARATUS ASSEMBLING METHOD

[75] Inventor: Ken Omura, Kanagawa-ken, Japan

[73] Assignee: Kabushiki Kaisha Toshiba, Kawasaki, Japan

[21] Appl. No.: 08/982,419

[22] Filed: Dec. 2, 1997

[30]     Foreign Application Priority Data

Dec. 18, 1996  [JP]  Japan ................................... 8-338277

[51] Int. Cl.⁶ .................................................. G02B 26/08
[52] U.S. Cl. ...................... 347/263; 347/245; 347/152; 347/170; 359/198; 399/110; 399/118
[58] Field of Search .................................. 347/231, 242, 347/243, 245, 257, 262, 263, 152, 170; 358/296; 359/198; 399/110, 118

[56]             References Cited

U.S. PATENT DOCUMENTS

| | | | |
|---|---|---|---|
| 4,774,531 | 9/1988 | Tokita | 347/135 |
| 4,912,563 | 3/1990 | Narita | 347/138 |
| 5,151,811 | 9/1992 | Makino | 359/198 |
| 5,430,524 | 7/1995 | Nelson | 358/401 |
| 5,751,431 | 5/1998 | Taka et al. | 358/296 |

FOREIGN PATENT DOCUMENTS

| | | | |
|---|---|---|---|
| 5-72457 | 3/1993 | Japan . | |
| 6-34904 | 2/1994 | Japan . | |
| 07038989 | 2/1995 | Japan | G02B 26/10 |

*Primary Examiner*—N. Le
*Assistant Examiner*—Hai C. Pham
*Attorney, Agent, or Firm*—Foley & Lardner

[57]             ABSTRACT

An optical scanner includes a light source to generate a light beam, a first optical unit to give a specified optical characteristic to the light beam emitted from the light source, a scanning unit including a rotatable member to scan a scanning object by applying the light beam passed through the first optical unit while rotating the rotatable member in a specified direction and a second optical unit to lead the light beam to form an image on a specified position of the scanning object; and a housing having a bottom portion to house the optical system, an opening portion provided at the side opposite to the bottom portion, a first reference surface that is used as a reference when the bottom side is set to a first external equipment and a second reference surface that is used as a reference when the opening side is set to a second external equipment.

1 Claim, 6 Drawing Sheets

OPTICAL SCANNER, IMAGE FORMING APPARATUS AND IMAGE FORMING APPARATUS ASSEMBLING METHOD

BACKGROUND OF THE INVENTION

1. Field of the Invention

The present invention relates to an image forming apparatus to form an image on a photosensitive drum according to an electrostatic photographing process and, more particularly, to an optical scanner as an exposure unit to form an electrostatic latent image on a photosensitive drum.

2. Description of the Related Art

An image forming apparatus using an electrostatic copying process, for instance, a digital copying machine is provided with an image reading portion to read an image of an original document as a copying object and an image forming portion to form a copying image based on the image that is read via the image reading portion and output it on a paper as a recording medium.

The image reading portion has a first carriage including an exposure lamp for scanning in one direction while illuminating an original document and a second carriage to guide the image information of the document to a photosensitive drum of the image forming portion following the first carriage.

The image forming portion has a photosensitive drum to carry an electrostatic latent image corresponding to the image information of the original document read by the image reading portion, an optical scanner as an exposure device to form an electrostatic latent image by exposing the photosensitive drum charged to a specified potential by generating a light beam corresponding to image information, a transferring device to transfer a developer image formed on the photosensitive drum onto a paper, etc.

The optical scanner included in the image forming portion has such optical element groups as a light source to generate a laser beam that is modulated according to image information, a first optical system to convert this laser beam into a parallel beam or a focusing beam, a light deflecting device to scan the laser beam in the specified direction and a second optical system to form the deflected laser beam into an image on the photosensitive drum. These optical element groups are arranged at specified locations in the housing, adjusted and then, fixed to the bottom of the housing.

This housing has one reference surface that is defined by three surfaces. When adjusting an optical axis and a beam diameter so that the laser beam emitted from the light source forms an image at a specified location on the photosensitive drum, the housing of the optical scanner is set on an adjusting device using this reference surface as a reference. Also, when mounting an adjusted optical scanner to the main body of the image forming apparatus, the scanner is fixed to the housing of the image forming apparatus using the reference surface utilized in the adjustment as the reference.

Generally, an optical scanner has a light deflecting device fixed at the bottom of its housing and a laser beam is emitted in the direction of a photosensitive drum from the bottom side of the housing where the light deflecting device is fixed. In such a housing, one reference surface is provided on the outer surfaces at its bottom for use as a reference for setting an adjusting device and as a reference for mounting an optical scanner to the main body of an image forming apparatus. In this case, the surface of the housing that is set for an adjusting device is in accord with the housing surface which is set when mounted to the main body of the image forming apparatus.

However, in case of an optical scanner in such structure that the housing surface that is set to a device when adjusting is not in accord with the housing surface that is set when mounting to the main body of the image forming apparatus, there is such a problem as shown below. That is, in case of a housing constructed to emit a laser beam to a photosensitive drum from an opening at the side opposite to the bottom side where a light deflecting device is provided with the optical axis between them, if a reference surface is provided on the opening side only, an optical scanner is mounted to the main body of an image forming apparatus using this reference surface as a reference. However, to perform the optical adjustment by setting an optical scanner on an adjusting device using this reference surface as the reference, a very large scaled device will be needed.

As described above, one reference surface is sufficient enough for optical scanners in the former structure but it is difficult to use one reference surface for both adjusting and mounting on optical scanners in the latter structure. Accordingly, it is necessary to manufacture a housing of an optical scanner suited to each image forming apparatus, for instance, digital copying machine, laser printer, etc. and it is not possible to manufacture highly efficient general purpose housings. Because of this defect, cost of the main body of the housing and its manufacturing cost can be increased.

SUMMARY OF THE INVENTION

It is an object of the present invention to provide an optical scanner that is capable of reducing cost with reference surfaces provided for use as references in optical adjustment and mounting to a main body of an optical scanner, an image forming apparatus equipped with this optical scanner and a method for assembling this image forming apparatus.

According to the present invention there is provided an optical scanner comprising an optical system including a light source to generate a light beam, a first optical means to give a specified optical characteristic to the light beam emitted from the light source, a scanning means including a rotatable member to scan a scanning object by applying the light beam passed through the first optical means while rotating the rotatable member in a specified direction and a second optical means to lead the light beam to form an image on a specified position; and a housing having a bottom portion to house the optical system, an opening portion provided at the side opposite to the bottom portion, a first reference surface that is used as a reference when setting the bottom side to a first external equipment and a second reference surface that is used as a reference when setting the opening portion to a second external equipment.

Further, according to the present invention there is provided an image forming apparatus comprising a main body; means provided in the main body for charging a photosensitive drum at a specified potential; exposure means for forming an electrostatic latent image on the photosensitive drum including a light source to generate a light beam corresponding to image data, a first optical means to give a specified optical characteristic to the light beam emitted from the light source, a scanning means including a rotatable member to scan the photosensitive drum by the light beam passed through the first optical means while rotating the rotatable member in the specified direction, a second optical means to lead the light beam to form the electrostatic latent image on a specified position of the photosensitive drum; a housing having a bottom portion to house the exposing means, an opening portion provided at the side opposite to the bottom portion, a first reference surface that is used as a reference when the bottom side is set on an external equipment and a second reference surface that is used as a reference when the opening side is set the main body; and means provided in the main body for developing the electrostatic latent image to obtain a developer image.

Furthermore, according to the present invention there is provided a method for assembling an image forming apparatus comprising the steps of arranging an optical system at a bottom of a housing, including a light source to generate a light beam, a first optical means to give a specified characteristic to the light beam emitted from the light source, a scanning means including a rotatable member to scan a scanning object by applying light beam passed through the first optical means while rotating the rotatable member in a specified direction and a second optical means to lead the light beam to form an image on a specified position of the scanning object; placing the optical system on a first external equipment based on the first reference surface provided on the surface contacting the first external equipment at the bottom; adjusting the optical system from the opening side of the housing where the optical system is exposed; fixing the optical system to the bottom of the housing; and mounting the housing provided with the optical system to a second external equipment based on the second reference surface provided on the surface contacting the second external equipment at the opening side.

DETAILED DESCRIPTION OF THE PREFERRED EMBODIMENTS

Hereinafter, preferred embodiments of an optical scanner and an image forming apparatus provided with this optical scanner of the present invention will be described in detail with reference to the attached drawings.

Figure 1:
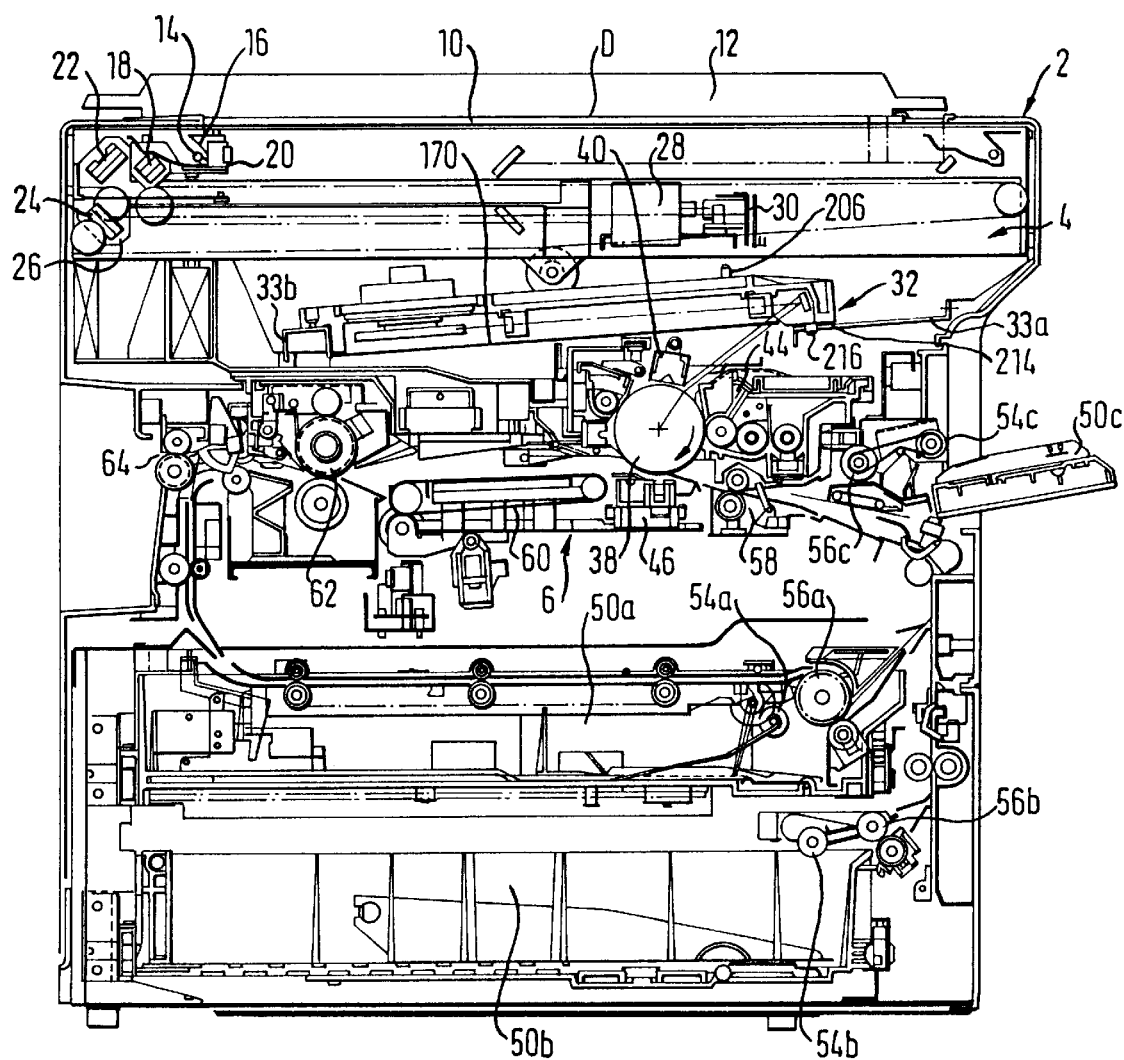
FIG. 1 is a sectional view schematically showing an image forming apparatus incorporating an optical scanner of the present invention.

FIG. 1 is a diagram schematically showing the sectional view of a digital type copying machine as an example of an image forming apparatus of the present invention.

As shown in FIG. 1, a copying machine 2 is composed of an image reading portion 4 to read image information by optically scanning a copying object, that is, an original document D and an image forming portion 6 to form an image on a paper that is a recording medium based on image information on the document read by the image reading portion 4.

The image reading portion 4 is composed of a document table 10 on which an original document D is placed and a document cover 12 formed so that it can be opened or closed against the document table 10 and closely hold an original document D to the document table 10.

Under the document table 10, that is, in the inside of the copying machine 2, an exposure lamp 14 to light the original document D placed on the document table 10, a mirror 16 to focus the light beam generated from the exposure lamp 14 on the original document D and a first mirror 18 to bend the reflected light from the original document D in the right angle direction are provided in one unit and a first carriage 20 is arranged to reflect the reflected light beam from the original document D in a specified direction. The first carriage 20 is arranged movably in parallel to the document table 10 and is reciprocated by a stepping motor (not shown) along the document table 10.

In the direction where the light beam reflected by the first mirror 18 is guided, a second mirror 22 and a third mirror 24 are arranged at a right angle to each other to bend the reflected light beam from the original document D that was bent by the first mirror 18. Further, the second mirror 22 and the third mirror 24 are fixed to a second carriage 26. The second carriage 26 is moved by a geared belt (not shown) for driving the first carriage 20 following the first carriage 20 in parallel to the document table 10 at a ½ speed of the first carriage 20.

In the surface under the first carriage 20 including the optical axis of the light beam bent by the second carriage 26, there is arranged an imaging lens 28 which is formed movable via a driving mechanism (not shown) to focus the reflected light beam from the second carriage 20 and form an image at a specified magnification by moving itself. In the direction of a reflected light beam including image information focused at a specified magnification by the imaging lens 28 progresses, a CCD sensor 30 is arranged to output image data as electric signals corresponding image information by imaging the reflected light beam.

The image forming portion 6 is composed of a laser exposing device, that is, an optical scanner 32 arranged as an exposing means to emit laser beam modulated based on image data converted by the CCD sensor 30 and a photosensitive drum 38 which is arranged at almost the center of the copying machine 2 and on which an image corresponding to an image of an original document is formed. This photosensitive drum 38 is rotated in the direction of arrow by a motor (not shown) at a specified speed.

Around the photosensitive drum 38, there are arranged a main charger 40 as a charging means to charge the photosensitive drum 38 with a specified electric charge, a developing device 44 as a developing means to develop an electrostatic latent image formed on the photosensitive drum 38 by supplying a toner, a transferring/separation device 46 to transfer a toner image formed on the photosensitive drum 38 on a paper and separate the paper electrostatically adsorbed to the photosensitive drum 38 when a toner image is transferred and a cleaning/charge elimination device 48 to scrape off a toner left on the surface of the photosensitive drum 38 and remove electric charge left on the surface of the photosensitive drum 38 in order.

At the position corresponding to the upper stream of the rotating direction of the photosensitive drum 38 below the copying machine in the example shown in FIG. 1, first and second paper cassettes 50a and 50b are arranged to retain paper on which images forced on the photosensitive drum 38, that is, toner images are transferred. Further, at the right side of the copying machine 2, a manual paper feed guide 50c which becomes a guide when manually inserting paper is arranged.

Above the first and the second paper cassettes 50a and 50b, there are provided pick-up rollers 54a and 54b to take out paper stored in these cassettes therefrom.

There are paper feed roller pairs 56a and 56b arranged near the pick-up rollers 54a and 54b to feed paper taken out by the pick-up rollers 54a and 54b toward the photosensitive drum 38.

There are a pick-up roller 54c to take the paper inserted into the manual paper feed guide 50c into the copying machine 2 and a paper feed roller 56c to send out the paper taken-in toward the photosensitive drum 38 near the manual paper feed guide 50c.

Between the photosensitive drum 38 and the paper feed roller pairs 56a and 56b and the pacer feed roller 56c, there is arranged an aligning roller pair 58 to correct the inclination of paper fed from the cassettes 50a, 50b or the manual paper feed guide 56c, align the tip of a toner image on the photosensitive dream 38 with the leading edge of paper and feed paper at the same speed as the moving speed of the outer surface of the photosensitive drum 38.

At the positions corresponding to the downstream of the transferring/separation device 46 along the rotating direction of the photosensitive drum 38, there are a conveying device 60 to convey the paper carrying a transferred image formed on the photosensitive drum 38, a fixing device 62 to fix a toner transferred on the paper by heating, fusing and pressurizing it and a outlet roller pair 64 to exit a paper with the toner image fixed to the outside.

Next, one example of the optical scanner 32 of the present invention that is applied to the image forming apparatus shown in FIG. 1 will be described.

Figure 2:
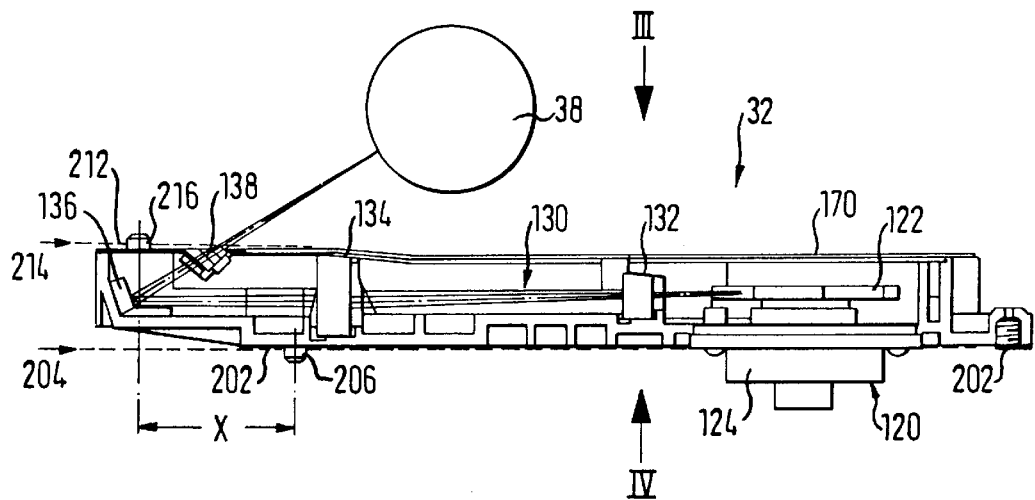
FIG. 2 is a sectional view of the optical scanner of the present invention.
Figure 3:
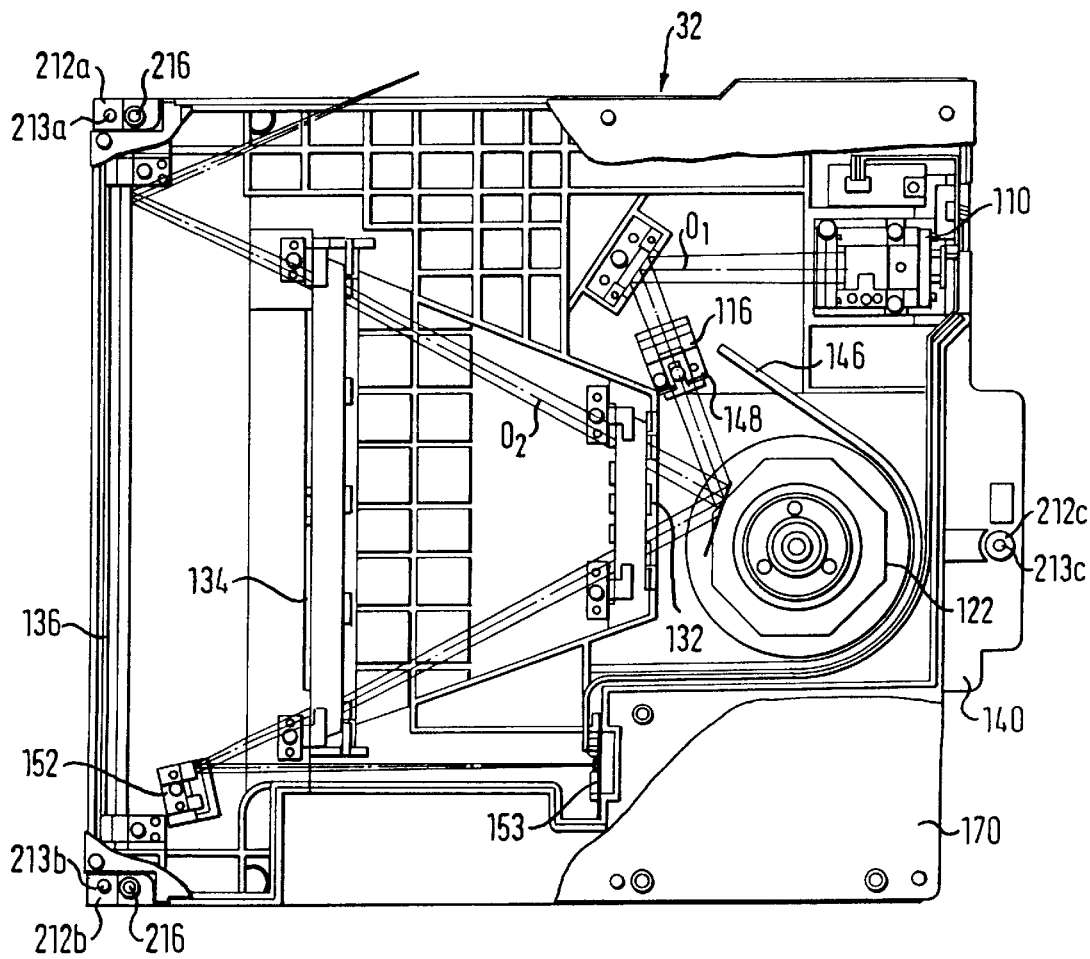
FIG. 3 is a plan view showing the state of the optical scanner shown in FIG. 2 when viewed from the direction of arrow III, that is, the opening side of the housing with the majority of its cover broken.

FIG. 2 is a plan view schematically showing an example of the optical scanner 32 of the present invention and FIG. 3 is a sectional view of the optical scanner 32 shown in FIG. 2.

As shown in FIG. 2 and FIG. 3, this optical scanner 32 is provided with a semiconductor laser element as a light source and a light generating unit 110. The semiconductor laser element generates a laser beam. The light generating unit 110 comprises a lens group as a first optical means to shape the sectional shape of the laser beam emitted from the semiconductor laser element to a desired shape. Further, the optical scanner 32 is provided with a light deflecting device 120, an optical imaging system 130 and a housing 140. The light deflecting device 120 deflects the laser beam emitted from the light generating unit 110 toward the photosensitive drum 38 which is a scanning object. The optical imaging system 130 including a lens group as a second optical means images the laser beam deflected by this light deflecting device 120 in almost the straight line shape on the surface of the photosensitive drum 38 along its rotating direction. The housing 140 closely houses the light generating unit 110, the light reflecting device 120 and the optical imaging system 130.

Figure 5:
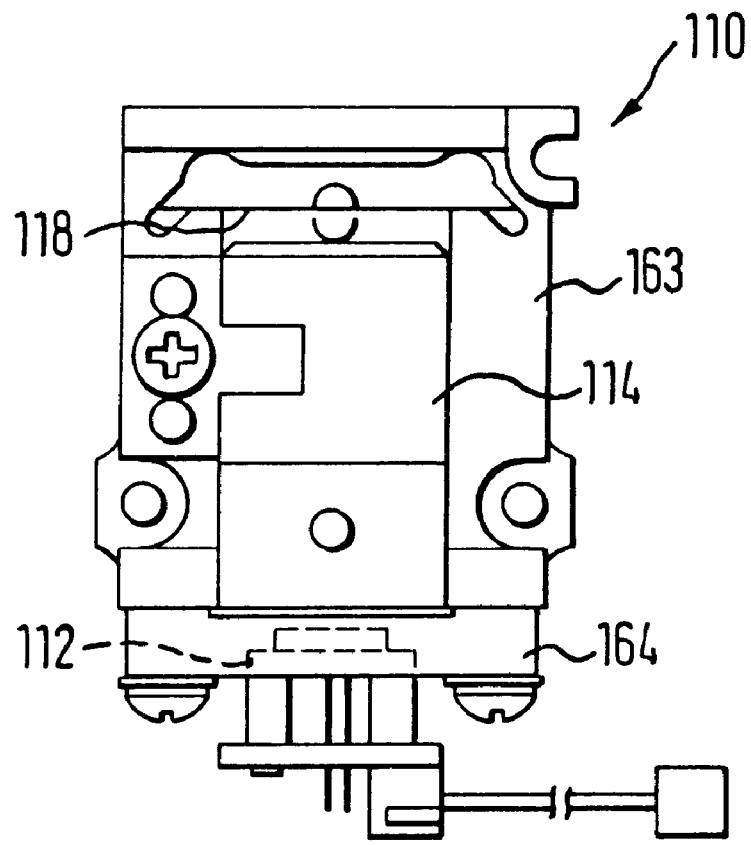
FIG. 5 is a plan view showing a light generating unit incorporated in the optical scanner shown in FIG. 2.
Figure 6:
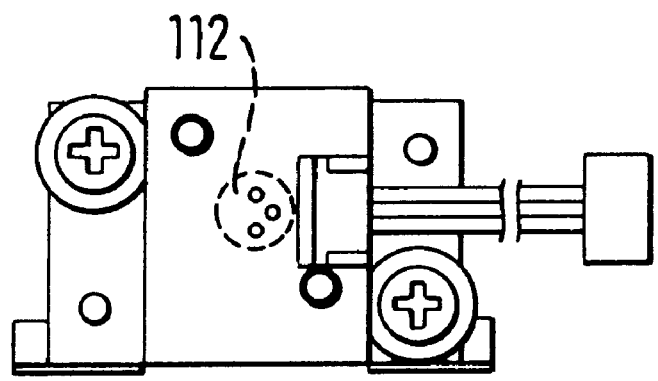
FIG. 6 is a front view of the light generating unit shown in FIG. 5 viewed from the light source side.

FIG. 5 is a plan view schematically showing the construction of the light generating unit 110 and FIG. 6 is a front view of the light generating unit 110 shown in FIG. 5 viewed from the semiconductor laser element side. The light generating unit 110 has a semiconductor laser element 112 to generate laser beam, a first lens 114 and a diaphragm 118. The first lens 114 has a curvature in the sub-scanning direction only and converts laser beam emitted from the semiconductor laser element 112 into focusing light or parallel light. The diaphragm 118 limits the laser beam passed through the first lens 114 to a beam spot in a specified size.

The first lens 114 is formed by an optical glass or a replica lens which is a plastic coated optical glass. The first lens 114 and the diaphragm 118 are held by a lens-barrel or a lens holder 163 formed by, for instance, aluminum die cast or such plastic as PPS. The semiconductor laser element 112 is screwed on the lens holder 163 in the state where the semiconductor laser element 112 is held at the holder 164.

The lens holder 163 is fixed with screws after positioned by a positioning member provided to the housing 140.

The laser beam shaped to a beam spot in a desired size by the diaphragm 118 is emitted from the light generating unit 110 and led to the Right deflecting device 120 via a second lens 116 as shown in FIG. 3.

The second lens 116 is a hybrid cylindrical lens manufactured by simultaneously molding optical glass, for instance, NaFD15 (manufactured by HOYA Corp.) and a plastic material, for instance, PMM (polymethylmethacryl).

The second lens 116 has a function to correct the color astigmatism in the sub-scanning direction that is generated in the optical imaging system 130. The second lens 116 is once fixed to a separate part so that it is able to slide in the direction of the optical axis by a rail shaped structure 148 provided on the housing 140 and then, arranged as a lens unit and fixed by such a connecting member as screws, etc. Thus, the second lens 116 becomes possible to absorb fluctuation of other optical parts. When the second lens 116 is a cylindrical lens having a positive power in the sub-scanning direction, the second lens 116 is fixed to the housing 140 as the second lens 116 has less fluctuation.

For a plastic material composing a hybrid cylindrical lens, it is preferred to use the basically same material as a plastic material that is applicable to the optical imaging system 130 after deflected. Further, a glass material composing the hybrid cylindrical lens is decided properly according to the degree of light focused in the sub-scanning direction.

Further, although the second lens 116 was fixed directly to the housing 140 separately from the light generating unit 110 in this embodiment, it may be composed in one united body with the light generating unit 110.

The light deflecting device 120 is provided with a deflecting mirror 122 that is a polygon mirror having 8 plane mirrors and a scanner motor 124 to rotate the deflecting mirror 122. The scanner motor 124 is provided with a motor shaft supported rotatable by a ball bearing and a rotor that is formed in one unit with this motor shaft. On this rotor, the deflecting mirror 122 is mounted by a ring and a spring or fixed by a screw, etc. and is rotated in the specified direction with the rotation of the scanner motor 124.

The scanner motor 124 can be an axial gap type motor, a radial type motor, a motor using a dynamic pressure bearing or a motor using a magnetic fluid bearing in addition to the construction descried above.

There is provided a surrounding wall 146 around the light deflecting device 120. At part of the surrounding wall 146, a gap is provided so as not to intercept the optical axis of the laser beam from the second lens 116 and that of the laser beam reflected on the deflecting mirror 122. In order to prevent the optical performance of the laser beam passing through this gap from becoming deteriorated, a light transmitting member such as a glass having a refractive index differing from the air is not arranged.

In the direction of laser beam reflected by the deflecting mirror 122, the optical imaging system 130 is arranged.

The optical imaging system 130 is provided with a third lens 132 and a fourth lens 134 that are provided for correcting distortion astigmatism and image surface curve when imaging the reflected laser beam on the surface of the photosensitive drum 38. These third and fourth lenses 132 and 134 are formed by plastic material such as PMMA, respectively. In this embodiment the optical axis C1 of the laser beam going to the light deflecting device 120 from the light generating unit 110 and the optical axis O2 of the laser beam going to the third lens 132 from the light deflecting device 120 are not in the same plane but they can be in the same plane.

The third and fourth lenses 132 and 134 compose a lens system in the main scanning direction orthogonal to the sub-scanning direction to satisfy the relation of h=fθ between the image height h on the photosensitive drum 38 and the focusing distance f of the optical system after deflection, that is, the optical imaging system to the rotating angle θ of each reflecting surface of the deflecting mirror 122. The third and fourth lenses 132 and 134 reduce the effect of the image surface curve of the laser beam reflected on the reflecting surface of the deflecting mirror 122 and make the distortion astigmatism to a proper value in the main scanning direction in the mutually combined state.

Between the fourth lens 134 and the photosensitive drum 38, there are provided a mirror 136 to bend the optical path of the laser beam and a dust proof glass 138 to enable the laser beam to arrive at the photosensitive drum 38 while tightly closing the housing 140.

In the embodiment shown in FIG. 2 and FIG. 3, although an example to correct a single laser beam generated from a single light generating unit 110 by the third arid fourth lenses 132 and 134 was described. However, the third and fourth lenses 132 and 134 are able to correct plural laser beams arranged in the sub-scanning direction by passing them simultaneously.

Figure 7:
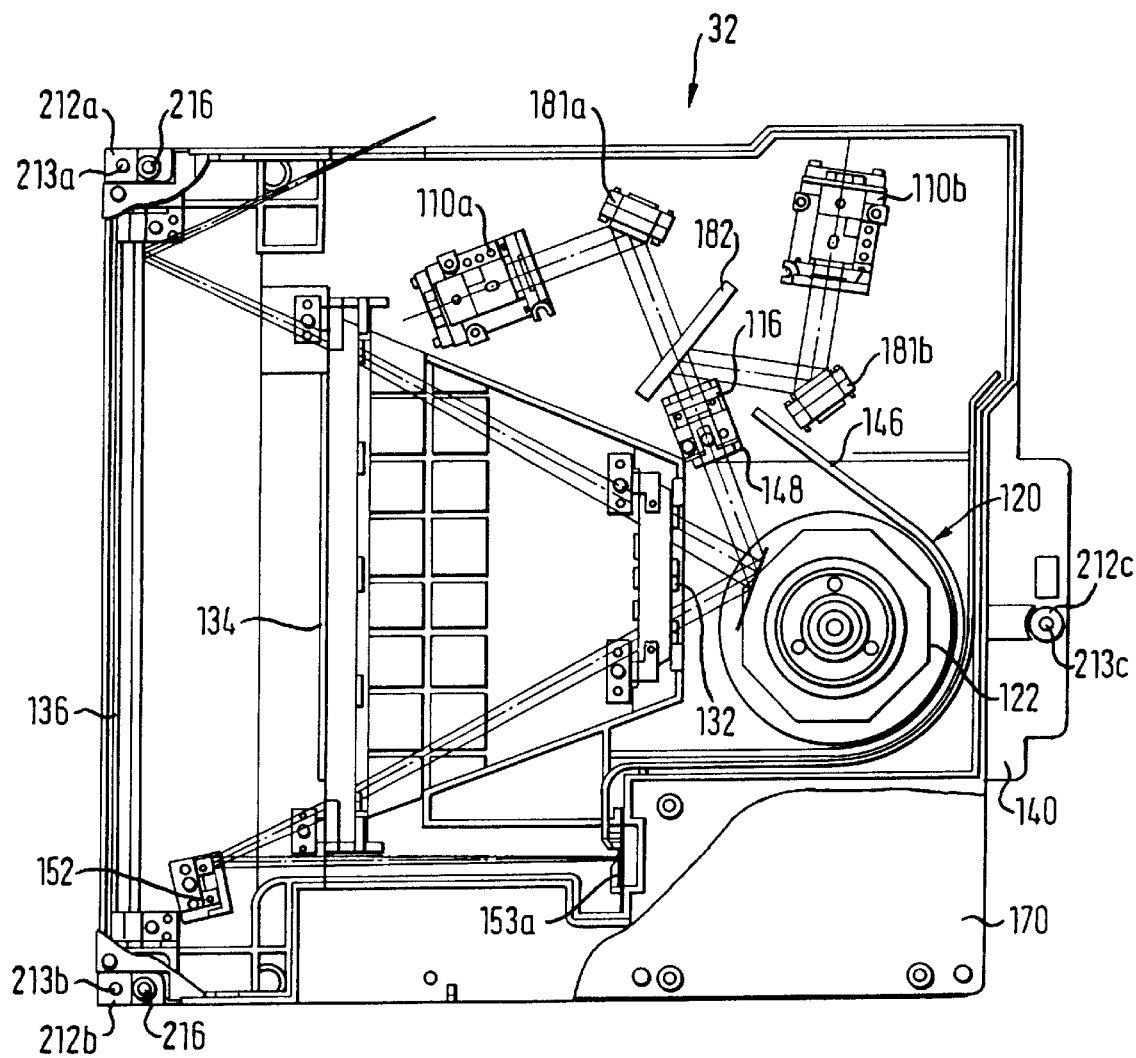
FIG. 7 is a plan view schematically showing an example of another optical scanner viewed from the side of the opening portion of the housing.
Figure 8:
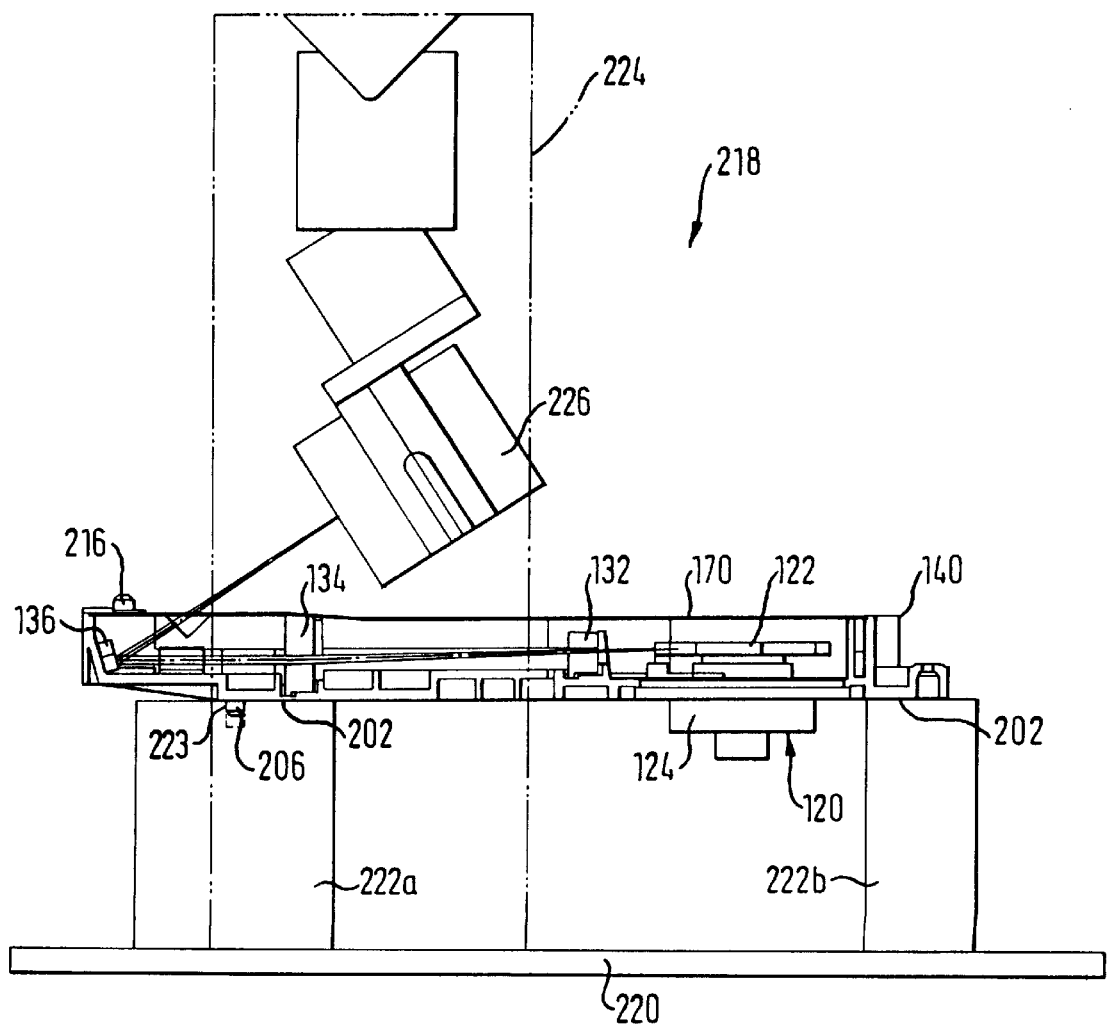
FIG. 8 is a schematic front view showing the optical scanner of the present invention set to an optical adjusting device.

That is, as shown in FIG. 7, there are provided light generating units 110a and 110b, mirrors 181a and 181b and a half mirror 182. The light generating units 110a and 110b are arranged as light sources. The mirrors 181a and 181b reflect-laser beams emitted from the light generating units 110a and 110b. The half mirror 182 combines the laser beams emitted from the light generating units 110a and 110b.

The mirrors 181a and 181b are supported by support members that are rotatable in the sub-scanning direction and have the function to finely adjust the relation of the imaging positions of respective laser beams in the sub-scanning direction.

The laser beam emitted from the light generating unit 110a is reflected by the mirror 181a and is incident into the second lens 116 after passing through the half mirror 182. The laser beam emitted from the light generating unit 110b is reflected by the mirror 181b and then, by the half mirror 182 and is incident into the second lens 116 after.

Two laser beams passing through the second lens 116 are imaged on the surface of the photosensitive drum 38 by the optical imaging system 130 after deflected by the light deflecting device 120 likewise a case of a single laser beam.

As plural laser beams scan on the photosensitive drum simultaneously, the high speed printing becomes possible without increasing the rotating speed of the deflecting mirror 122.

The housing 140 is provided with a positioning member or a positioning mechanism to position the light generating unit 110, the second lens 116 and the light deflecting device 120 at its bottom. In addition, the housing 140 is provided with a fixing guide member to position and fix the third and fourth lenses 132 and 134, the mirror 136 and the dust proof glass 138 for forming the optical imaging system 130. These third and fourth lenses 132 and 134, the mirror 136 and the dust proof glass 138 are fixed to the fixing guide member of the housing 140 by plate shaped elastic members and fastening members. These optical parts may be fixed with a visible lay hardening type bonding agent.

In this case, the bonding points relative to the mirrors and the dust proof glass are decided properly according to required strength. This was described in detail in Japanese Unexamined Patent Publication No. 05-80268.

The optical scanner 32 is provided with a horizontal sync detecting mirror 152 and a sync signal detector 153 for detecting the horizontal synchronization relative to the main scanning direction of laser beams. The horizontal sync detecting mirror 152 is provided in the area outside the area of laser beams that passed through the fourth lens 134 and become an image to be printed when arrived at the photosensitive drum 38. Further, the sync signal detector 153 is provided at a specified position of the housing 140 where the laser beam reflected via the horizontal sync detecting mirror 152 can be positively detected.

When scanning plural laser beams simultaneously as shown in FIG. 7, a sync signal detector 153a is provided with a function to detect an imaging position in the sub-scanning direction in addition to the function of the horizontal sync detection. Amounts to rotate the mirrors 181a and 181b are decided by the imaging positions of laser beams in the sub-scanning direction detected by the sync signal detector 153a.

The side where the opening of the housing 140 is formed, that is, the side opposite to the plane surface that is defined by the optical axes 01, 02 at the bottom where the light generating unit 110 and the light reflecting device 120 are fixed is covered by a cover 170 so that the optical scanner 32 is closed tightly in the housing 140.

Figure 4:
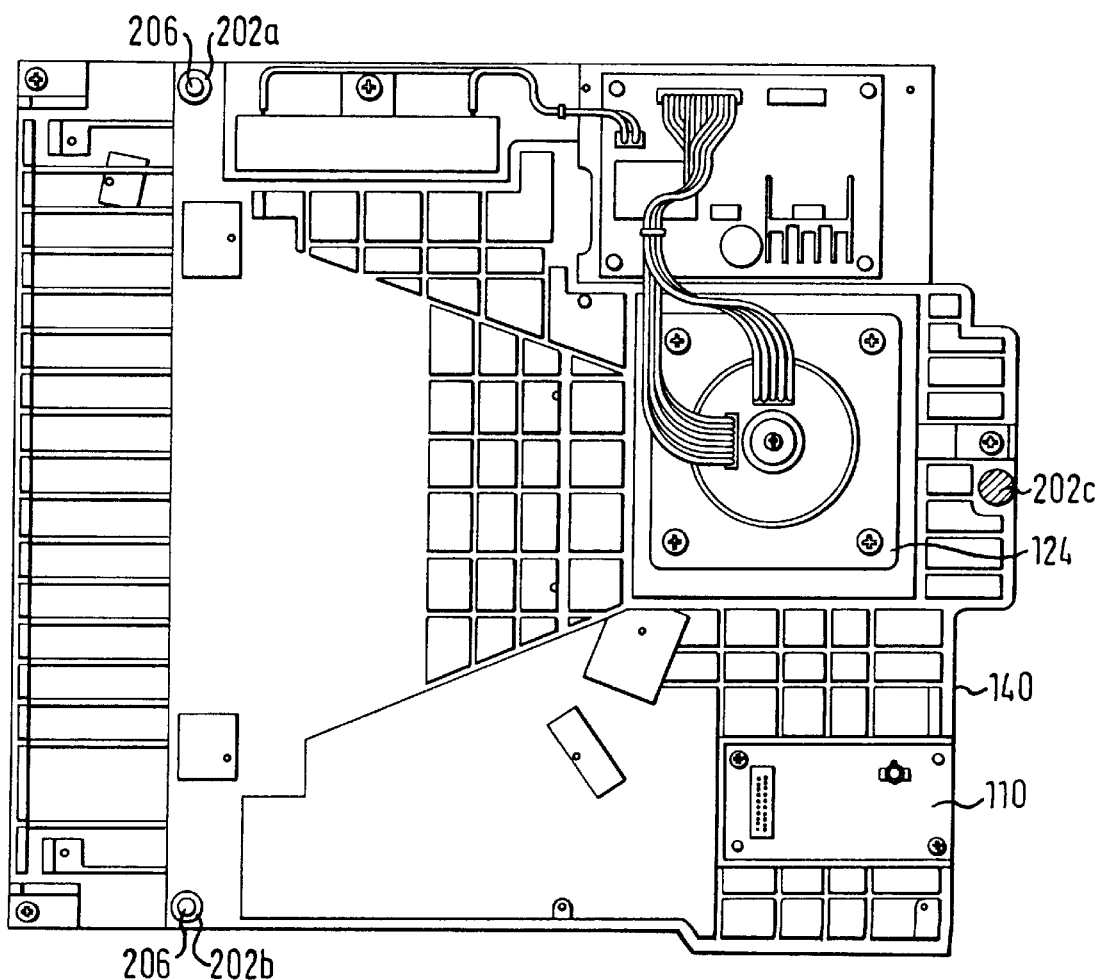
FIG. 4 is a plan view showing the state of the optical scanner shown in FIG. 2 viewed from the direction of arrow IV, that is, the bottom side of the housing.

The housing 140 of the optical scanner 32 has plural reference portions 202a, 20b and 202c formed at positions separated each other on the outer surface of the bottom as shown in FIG. 2 and FIG. 4. These reference portions 202a–202c are formed in the same plane surface and define a first reference surface 204. That is, the reference portion 202a is formed at the upper left in FIG. 4 and the reference portion 202b is formed at the lower left in FIG. 4. The reference portion 202c is formed at the right in FIG. 4, that is, near the scanner motor 124.

In the reference portions 202a and 202b, bosses 206 are formed projecting therein. These bosses 206 may not be formed in the reference portions but can be formed near them. These bosses 206 are fit into positioning holes provided at the external equipment side and function as positioning means when the housing 140 of the optical scanner 32 is set to another external equipment such as an optical adjusting device, etc.

Further, the housing 140 of the optical scanner 32 has plural reference portions 212a, 212b and 212c formed at positions separated each other on the outer surface at the opening side. Two reference portions 212a and 212b of these plural reference portions are formed in the same plane and define a second reference surface 214. That is, the reference portion 212a is formed at the upper left in FIG. 3 and the reference portion 212b is formed at the lower left in FIG. 3. The reference portion 212c is formed at a position lower than the reference portions 212a and 212b defining the second reference surface 214 at the right in FIG. 3, that is, near the deflecting mirror 122.

Near the reference portions 212a and 212b defining the second reference surface 214, there are bosses 216 formed projecting and screw holes 231a, 213b and 213c are formed in the reference portions 212a, 212b and 212c.

These bosses 216 are fit into positioning holes provided at the external equipment side and function as positioning means when the housing 140 of the optical scanner 32 is set to another external equipment such as a main body of a copying machine likewise the bosses 206 for the first reference surface. The second reference surface 214 is formed almost in parallel with the first reference surface 204.

In an example of the optical scanner shown in FIG. 2 through FIG. 4, bosses were used as the positioning means but it may be so constructed that an opening portion is provided in the reference plane or near it and bosses are provided at the external equipment side and they are positioned each other.

For instance, when assembling the optical scanner 32, the mirror 136, horizontal sync detecting mirror 152, deflecting mirror 122, second, third and fourth lenses 116, 132 and 134 and light generating unit 110 are arranged and assembled at specified positions in the housing 140.

Then, the housing 140 with optical components assembled is installed to an optical adjusting device 218. The optical adjusting device 218 is composed of a first block 222a and a second block 222b arranged on a table 220, a frame 224 provided on the table 220 and a beam measurement 226 mounted to the frame 224. The beam measurement 226 is mounted to the frame 224 so that the housing 140 is positioned at the position where the photosensitive drum 38 was positioned when it is mounted to the main body of the copying machine 2. On the top of the first block 222a, there is a positioning hole 223 formed. The housing 140 places the reference portions 202a and 202b defining the first reference surface 204 provided at the bottom side on the top of the first block 222a and the reference portion 202c on the second block 222b. At the same time, by fitting two bosses 206 into the positioning holes 223 formed on the first block 222a, the optical adjusting device 218 of the housing 140 is positioned when mounting it. That is, based on the first reference surface 204 formed on the bottom side of the housing 140, the bottom side is provided for installing the optical adjusting device 218 and the opening side of the housing 140 is left open from the optical adjusting device 218.

Then, a laser beam is applied to the beam measurement 226 from the opening side of the housing 140. While measuring a diameter of this laser beam the mounting position of the first lens 114 of the light generating unit 110 is adjusted so as to make this beam diameter to a specified size. After this adjusting, the first lens 114 is bonded to the lens holder 163. Further, the mounting position of the horizontal sync detecting mirror 152 is adjusted so that laser beam is incident to the sensor portion of the sync signal detector 153.

Thus, the adjusting work of optical components by the optical adjusting device 218 is completed.

Then, the cover 170 is mounted to cover the opening of the housing 140.

Then, the housing 140 is removed from the optical adjusting device 218 and the assembling work of the optical scanner 32 is completed.

Next, the assembled optical scanner 32 is mounted to the main body of the image forming apparatus. In this embodiment, the optical scanner 32 is constructed so as to emit the laser beam to the opening side opposite to the plane including the optical axes O1 and O2 against the bottom of the housing with the optical parts including the light deflecting device 120. Therefore, the optical scanner is mounted with the opening side directed to the lower side, that is the photosensitive drum 38 because the photosensitive drum 38 of the main body of the image forming apparatus is provided below the optical scanner.

At this time, it makes the working process complicated to mount the optical scanner 32 to the main body of the image forming apparatus based on the first reference surface 204. That is, in order to mount the optical scanner to the main body of the image forming apparatus based on the first reference surface, it is necessary to fix the first reference surface with such fixing members as screws while pushing it against the supporting portion at the main body side from the lower side.

So, this optical scanner 32 is mounted to the main body of the image forming apparatus based on the first reference surface 204 at the bottom and the second reference surface 214 formed at the opening side in almost parallel with the first reference surface 204. That is, the optical scanner 32 is inserted into the image forming apparatus from its top at the time of the open state where a scanner assembly including the document table 10, the document cover 12, the exposure lamp 14, the first mirror 18, the first carriage 20, the second mirror 22, the third mirror 24, the second carriage 26, the imaging lens 28 and the CCD sensor 30 is not mounted on the top of the image forming apparatus. The inserted optical scanner 32 is fixed with such fixing members as screws in the state where the second reference surface 214 formed at the opening side of the housing 140 is placed on the supporting portions 33a and 33b at the main body side of he image forming apparatus.

That is, the optical scanner 32 is positioned by inserting the boss 216 formed on the second reference surface 214 into a hole provided on the supporting portion 33a. The housing 140 is mounted in the copying machine 2 by screwing it into the supporting portion 33a via the screw holes 213a and 213b provided on the second reference surface 214 and the supporting portion 33b via the screw hole 213c.

Needless to say, in case of an optical scanner in a structure to emit laser beam from the bottom side of the housing provided with a light deflecting device, the optical scanner is mounted to the main body of the image forming apparatus based on the first reference surface at the bottom.

After the optical scanner 32 is fixed in the main body of the image forming apparatus, the scanner assembly including the document table 10, the document cover 12, the exposure lamp 14, the mirror 16, the first mirror 18, the first carriage 20, the second mirror 22, the third mirror 24, the second carriage 26, the imaging lens 28 and the CCD sensor 30 is mounted to the top of the main body of the image forming apparatus.

As described above, in the directions opposite to each other with the optical axis between, that is, the first reference surface is formed at the bottom side of the optical scanner and the second reference surface is provided at the opening side in almost parallel with each other. As a result, it becomes possible, for instance, to make the first reference surface as an adjusting reference for mounting an adjusting device and the second reference surface as a reference for mounting the optical scanner to the main body of the image forming apparatus. Accordingly, it is possible to provide an optical scanner and an image forming apparatus with less adjusting error and mounting error without requiring a large scale adjusting device. Further, as a device is simplified and the number of adjusting steps can be reduced, it becomes possible to reduce manufacturing cost.

Further, as the housing of this optical scanner has plural reference surfaces, it becomes possible to apply it to various models. That is, as the degree of freedom to mount an optical scanner increases and it becomes possible to commonly use an optical scanner, it is possible to provide an optical scanner having a high general purpose usability. Because of this, it becomes possible to reduce the cost of housing and manufacturing cost.

Next, the positional relation of the boss 206 as a positioning means existing in the first reference surface 204 with the boss 216 as a positioning means existing in the second reference surface 214 will be described.

As it is possible to correct an opt al characteristic of the optical scanner when adjusting it by obtaining it experimentally in the mounted state, the boss 206 in the first reference surface 204 and the boss 216 in the second reference surface 214 can be arranged basically at any positions of the optical scanner.

However, when considering a fluctuation in housing lots, it is necessary to change a correction value for every lot and the number of working steps increase and not desirable.

It is therefore ideally desirable to position the boss 206 of the first reference surface and the boss 216 of the second reference surface on the same straight line. That is, it is desirable that the straight line that is vertical to the first reference surface 204 and is passing the center of the boss 206 is in accord with the straight line that is vertical to the second reference surface 214 and is passing the center of the boss 216.

Actually, the bosses 206 ad 216 may not be required to be on the same straight line and can be positioned near each other. In this embodiment, a distance X between the position of the foot of a perpendicular of the boss 206 and that of the boss 216 is 55 mm as shown in FIG. 2. Actually, if the distance X including a margin is less than 80 mm, it is not necessary to change a correction value for every lot of the housing.

In the above embodiment, the image forming apparatus of the present invention is described taking a digital copying machine as an example but needless to say, it is possible to apply the present invention to other image forming apparatus, for instance, a laser beam printer.

As described above, according to the present invention, reference surfaces that become references in performing the optical adjustment and mounting to the main body are provided and an optical scanner capable of reducing cost, an image forming apparatus equipped with this optical scanner and an assembling method of this optical scanner are provided.

What is claimed is:

1. A method for assembling an apparatus comprising the steps of:

arranging an optical system at a bottom of a housing, the optical system including a light source to generate a light beam, first optical means to give a specified optical characteristic to the light beam emitted from the light source, a second member configured to scan a scanning object in an image-forming apparatus by applying the light beam passed through the first optical means while rotating the second member in a specified direction and second optical means to lead the light beam to form an image on a specified position of the scanning object, wherein the housing includes a first surface having an opening for exposing the light beam on the scanning object and a second surface opposing the first surface;

mounting the housing to an optical adjustment device so that the first surface is above the second surface to locate the opening upward, using the second surface as a first reference surface against the optical adjustment device;

adjusting the optical system using the optical adjustment device through the opening which is located upward;

removing the housing from the optical adjustment device; and mounting the housing to above image-forming apparatus so that the second surface is above the first surface, against the image-forming apparatus, wherein the scanning object is positioned at a position below the first surface.

* * * * *